United States Patent [19]

Beck et al.

[11] Patent Number: 5,028,029
[45] Date of Patent: Jul. 2, 1991

[54] MIRROR SWING LOCK MECHANISM

[75] Inventors: Marlin E. Beck, Allentown; Kyle R. Smith, Kutztown, both of Pa.

[73] Assignee: Delbar Products, Inc., Perkasie, Pa.

[21] Appl. No.: 491,074

[22] Filed: Mar. 9, 1990

[51] Int. Cl.$^5$ .............................................. A47G 1/24
[52] U.S. Cl. ................................. 248/479; 248/289.1; 248/900
[58] Field of Search .............. 248/479, 900, 549, 486, 248/282, 289.3, 289.1; 350/631, 632, 636; 74/501 M; 403/120, 121

[56] References Cited

U.S. PATENT DOCUMENTS

| | | | |
|---|---|---|---|
| 2,602,622 | 7/1952 | Smith | 248/293 |
| 3,212,124 | 10/1965 | McDonald | 16/327 |
| 3,482,464 | 12/1969 | Reich | 403/120 X |
| 4,623,115 | 11/1986 | Brester | 248/289.1 X |
| 4,728,181 | 3/1988 | Kakinuma | 350/632 |
| 4,789,232 | 12/1988 | Urbanek | 350/632 |
| 4,793,582 | 12/1988 | Bronstein | 248/486 X |
| 4,909,619 | 3/1990 | Eifert | 248/479 X |

FOREIGN PATENT DOCUMENTS 980585 1/1965 United Kingdom ............... 248/479

Primary Examiner—J. Franklin Foss
Attorney, Agent, or Firm—Reising, Ethington, Barnard, Perry & Milton

[57] ABSTRACT

The invention relates to a vehicle outside rear view mirror assembly of the type wherein the mirror may be rotated between a laterally extended rear viewing position and a folded back non-viewing position, and more particularly which includes a goose-neck mirror supporting arm having a vertical arm portion including first detent means formed integrally therein and which means coacts with second detent means formed in a resiliently deformable mirror arm supporting subassembly.

10 Claims, 2 Drawing Sheets

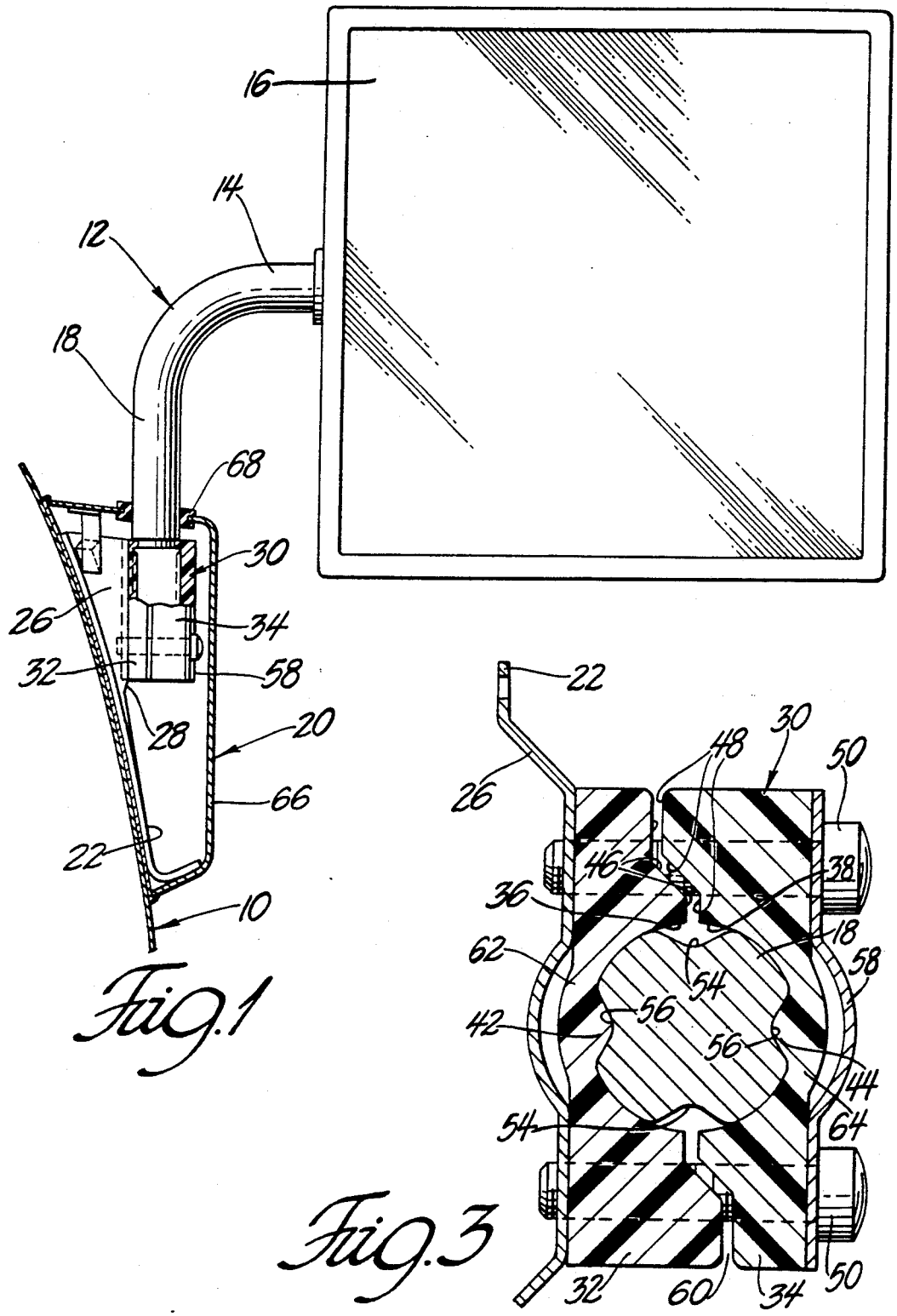

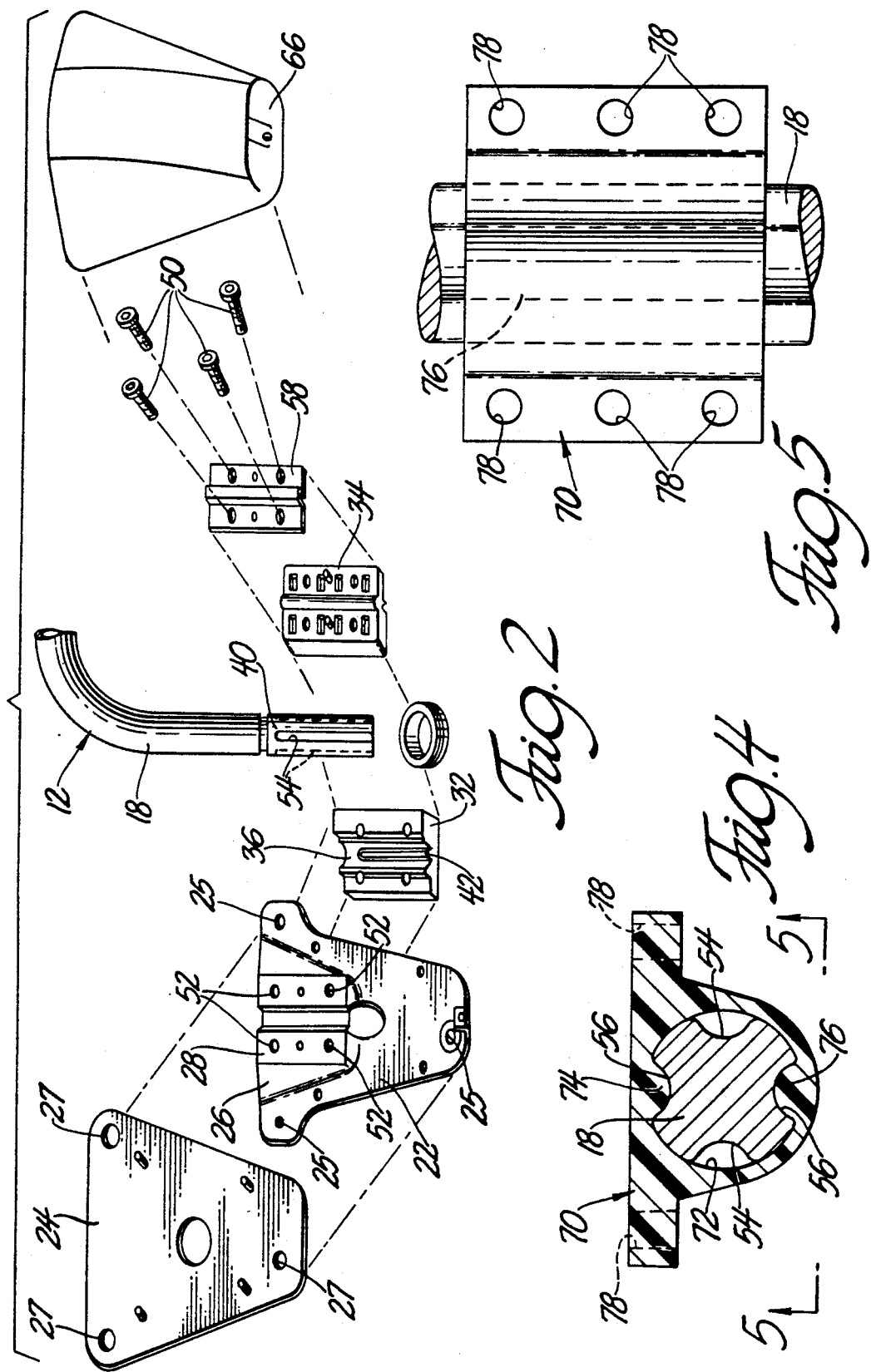

MIRROR SWING LOCK MECHANISM

BACKGROUND OF THE INVENTION

The present invention relates to outside rear view mirrors for vehicles wherein the mirror has a normally laterally extended position for rear viewing and a second or storage position wherein the mirror is folded back against or close to the vehicle body normally to prevent damage to the mirror. The folded back or non-viewing position of such a mirror is utilized under conditions where an extended mirror is likely to be damaged For instance, when a vehicle is being transported the mirror can be folded back against the vehicle body so as to prevent inadvertent engagement of the mirror. In addition, under certain conditions where the vehicle is traversing an opening which, while wide enough for the vehicle body to pass through, such opening would not be wide enough to allow clearance of the mirror.

When such a mirror is being returned to its extended or rear viewing position from its folded back position, it is desirable that the mirror be returned to a precise position, for instance, its laterally maximum extended position. It is likewise desirable that the mirror have a predetermined folded back position. Accordingly, it is desirable to provide a mechanism which releasably retains the mirror in either its extended rear viewing position or in its folded back non-viewing position. The present invention provides an improved means for thus releasably retaining the mirror in either of the aforesaid positions.

PRIOR ART

Mirror mechanisms of the type to which the subject invention generally relates are shown in U.S. Pat. Nos. 3,119,591 Malecki, U.S. Pat. No. 3,730,474 Bowers and U.S. Pat. No. 4,523,735 Beck et al. Each of the foregoing patents shows a mechanism for releasably retaining an outside mirror in either its extended rear viewing position or in its stored or non-viewing position against the vehicle body. Each of the aforementioned patents also includes detent mechanisms for retaining the mirror in either of two predetermined positions.

While each of the foregoing patented devices has been used successfully commercially, they are variously used with mirrors supported by bracket assemblies adapted to be connected at vertically spaced points to the vehicle body. Such vertically spaced support for the mirror mounting bracket is important since one of the primary problems with relatively heavy-type outside rear view mirrors is the problem of vibration which, if it occurs, can blur the image being viewed in the mirror.

The present invention is dealing with a different type of mirror support and, therefore, has required the development of a different type of mirror locking mechanism. More specifically, the present mirror arrangement utilizes what is termed a "goose neck" mirror supporting arm. The "goose neck" or L-shaped supporting arm includes a horizontal portion upon which the mirror is adjustably supported and a vertical portion adapted to be mounted close to the vehicle body. In order to support such a "goose neck" arm arrangement in a relatively vibration-free manner, it was necessary to develop a releasable locking mechanism, a portion of which is formed in the vertical portion of the mirror supporting arm and the other portion of which is formed in the bracket assembly which supports the arm upon the vehicle body. More specifically, the present invention utilizes vertically extending detent means respectively formed on the vertical portion of the mirror supporting arm and in the bracket assembly and further which elongated detent means are disposed generally parallel to the vertical axis about which the mirror may be rotated between its extended and folded back positions.

The means by which the advantages of the present invention are realized will be clearly understood from the following description of a preferred embodiment of the invention selected for the purposes of illustration having reference to the drawings wherein:

BRIEF DESCRIPTION OF THE DRAWINGS

FIG. 1 is a side elevational view of an outside mirror assembly sectioned through the mirror arm supporting bracket sub-assembly.

FIG. 2 is an exploded view of the disassembled bracket sub-assembly.

FIG. 3 is an enlarged sectional view through those parts of the bracket sub-assembly and the mirror support arm forming the mirror arm detent mechanism.

FIG. 4 is a modified detent mechanism.

FIG. 5 is an elevational view along line 5—5 of FIG. 4.

DESCRIPTION OF THE PREFERRED EMBODIMENT

The preferred embodiment of the subject invention is shown in FIGS. 1 through 3 of the drawings and this modification will now be described. Referring to FIG. 1, the side panel of a vehicle body is indicated generally at 10. Such panel most normally is the outer panel of either of the front doors of the vehicle. An L-shaped or "goose neck" type mirror supporting arm is indicated generally at 12 and includes a horizontally extending portion 14 to which a mirror head 16 is adjustably supported. As shown in the drawing, the mirror supporting arm 12 is in its fully laterally extended position wherein the mirror head 16 is positioned for rear viewing The mirror head is supported upon the horizontal arm portion 14 in such a way as to be adjustable about said arm portion to accommodate the rear field of view to a particular driver This particular mirror adjusting arrangement is not part of the present invention and, therefore, is not shown. The mechanism which is shown in detail and which constitutes the subject matter of the present invention, is the arrangement whereby the mirror supporting arm 12 may be rotated from its laterally extended position to a second position closely proximate the side of the vehicle Mirror mounting arm 12 includes a vertical portion 18 which depends from the horizontal portion 14 and which is supported upon the vehicle panel 10 through a bracket assembly indicated generally at 20. Bracket assembly 20 is shown in its fully assembled and mounted position in FIG. 1 of the drawings. FIG. 2 of the drawings shows an exploded view of assembly 20 with the various parts proximately disassembled. FIG. 3 is an enlarged sectional view particularly showing the detent mechanism of the bracket assembly. The mechanism will now be described by reference to FIGS. 1 through 3 of the drawings.

Assembly 20 includes a first plate member 22 having a shape conforming to the contour of the vehicle door panel 10. A suitable flexible grommet member 24 is provided and has the same general configuration as plate 22 and is adapted to be disposed between the plate and the door panel. Grommet 24 protects the door's paint finish and helps seal the interior of bracket assembly Plate 22 and grommet 24 include registering holes 25 and 27 therethrough which accommodate suitable screw means, not shown, for mounting the plate and grommet to the vehicle door. Plate 22 includes a laterally offset portion 26 having a generally vertical face 28 to which a mirror supporting bracket subassembly, indicated generally at 30 is adapted to be secured.

The bracket subassembly 30 consists of two identical members 32 and 34 which together are adapted to be supported upon surface 28 of plate 22.

Plate 22 is preferably formed of a relatively thin gauge steel although it could also be made of high strength plastic. Subassembly members 32 and 34, on the other hand, are formed of a relatively rigid plastic material such as a non-cellular urethane of the type marketed by B.F. Goodrich under the trademark "ESTANE" More will subsequently be said about the important physical characteristics of the urethane material.

The plastic subassembly members 32, 34 are molded to provide semi-circular surfaces 36 and 38 which coact with the circular section 40 of the mirror supporting arm portion 18. The relationship between the diameters of surfaces 36, 38 and circular section 40 of mirror arm portion 18 is important and will be discussed later in this description. The semi-circular surfaces 36, 38 of members 32, 34 are each formed to provide longitudinally extending or elongated ribs 42 and 44. As will subsequently be described in greater detail, the ribs 42, 44 form a part of a detent mechanism for positioning the mirror supporting arm 12 between its laterally extended position and its folded back position. The proximate interfaces of members 32 and 34 include various planar surfaces 46 and 48 extending outwardly from the cylindrical surfaces 36, 38 and which planar surfaces are adapted to be proximately spaced when the members are secured together by suitable screw elements 50 which extend through aligned holes in the members and thread into holes 52 in plate member 22.

The cylindrical section 40 of mirror supporting arm 12 includes two oppositely facing sets of recesses or flutes 54, 56 which correspond in cross-sectional shape to the ribs 42 and 44 of bracket subassembly members 32 and 34. Thus, when the bracket subassembly members are joined together, ribs 42, 44 are adapted to nest within either of the flute of recess sets 54 or 56 of mirror supporting arm. For illustrative purposes and referring to the parts positioned as shown in FIG. 3, mirror arm 12 can be assumed to be in its fully laterally extended position when the ribs 42 and 44 are thus nested into the recess set 56.

In order to prevent screw damage to the outer subassembly member 34, a metal plate 58 is utilized between said member and the heads of screws 50.

As noted, the material used to form mirror arm supporting members 34, 36 is most important to the invention as is the configuration of these members. The material must be both relatively rigid and yet deformable to provide the detent function while as the same time providing a mirror arm support that is relatively vibration free. A material which satisfies these requirements is the aforenoted non-cellular urethane marketed under the name ESTANE.

When the components are assembled, there is an interference fit between the cylindrical surfaces 36, 38 of members 32, 34 and section 40 of mirror support arm 12. In other words, the diameter of section 40 is larger than the diameters of surfaces 36, 38. As seen in FIG. 3, the interference fit results when members 34 and 36 are joined by screws 50 to clamp arm section 40 therebetween. In order to permit adjustment of the arm clamping pressure, the dimensions of member surfaces 46 and 48 are such as to provide a gap indicated at 60 when the parts are assembled.

For instance, when the components are assembled, gap 60 could be about 0.020 of an inch. Thus, the torque required to rotate mirror arm 12 within support 20 can be adjusted by the degree of tightening of screws 50.

The need for such interference fit or negative clearance between members 32, 34 and arm section 40 is to reduce the likelihood of arm vibration. At the same time, it is necessary to provide a way for ribs 42, 44 to be radially deformed or displaced sufficiently to allow the ribs to be moved out of their nesting positions within recesses 54, 56 as arm 12 is rotated. To permit such deformation or displacement, the wall portions 62, 64 immediately behind ribs 42, 44 is thinned to a thickness in the range of 0.085 and 0.125 of an inch. Thus, when it is desired to rotate the mirror supporting arm and mirror head to its folded back or non-viewing position proximate the side of the vehicle, a rotating force is applied to the mirror head 16 and through horizontal arm portion 14 to rotate the vertical portion 18 about its vertical axis. Under such rotating force, wall portions 62, 64 permit the ribs to be radially displaced out of nesting engagement with arm recesses 54 until such time as the opposite set recesses 56, for example, are aligned with the ribs and under which condition the ribs snap back into these recesses to retain the mirror arm in its second or folded back position which is approximately 90 degrees from the fully laterally extended position.

Finally, a cover member 66 is provided to enclose the inner components of the assembly. Cover 66 includes an opening in the upper surface thereof to allow the vertical portion 18 of the mirror supporting arm to extend therethrough. A suitable grommet 68 is provided in the cover opening to seal the interior of the assembly.

A second modification is illustrated in the views of FIGS. 4 and 5. In this case an integral or one-piece member 70 replaces the two identical members 32 and 34 of the preferred modification shown in FIGS. 1 through 3. Member 70 is again made of a high strength plastic material such as the aforedescribed non-cellular urethane. Member 70 includes a tubular opening 72 having oppositely facing radially inwardly projecting ribs 74, 76. Mirror supporting arm portion 18 again includes the elongated oppositely facing groove sets 54, 56 which coact with ribs 74, 76 to variously releasably retain mirror arm 12 in either its mirror extended or folded back positions. Again the walls of member 70 immediately behind ribs 74, 76 are thin enough, e.g. 0.085–0.125 of an inch, to allow for the radial displacement of the ribs as mirror arm 12 is rotated about its vertical axis.

Once again, there is an interference fit between arm section 40 of arm 12 and tubular opening 72 of member 70 with the diameter of section 40 being somewhat larger than that of opening 72. The interference can be in the range of 0.010–0.020 of an inch depending on the degree of torque resistance desired. Unlike the modification of FIGS. 1–3, once the dimensions of the tubular opening 72 and the circular portion 40 are established, no further torque adjustment can be made.

As seen in FIG. 5, member 70 is relatively elongated and includes holes 78 through which the member can be mounted to a plate corresponding to 22 through suitable screws not shown. Again, the mounting of member 70 is such as to allow for the radial outward displacement of ribs 74, 76.

Other modifications are possible within the scope of the invention as set forth in the hereinafter appended claims.

What is claimed is:

1. A mirror swing lock mechanism of the type including an arm (12) having a generally horizontal mirror supporting section (14) and a depending generally vertical section (18), a bracket assembly (30) for adjustably supporting said vertical arm portion to the exterior surface of a vehicle, the bracket assembly and the vertical arm section coacting to provide a mechanism for releasably retaining said arm in a plurality of positions about a generally vertical axis coaxial with the vertical arm section, the improvement in said mechanism comprising:
   a) the vertical arm section (18) having a portion (40) of circular cross section in the outer surface of which first detent means (54, 56) is formed;
   b) the bracket assembly including means (32, 34) defining a generally cylindrical surface (36, 38) adapted to receive and support the circular portion of the vertical arm section, the diameter of said arm portion (40) being larger than that of said cylindrical surface to provide an interference fit between said arm portion and said means; and
   c) second detent means (42, 44) formed in said cylindrical surface and coacting with the first detent means to releasably retain said arm in a plurality of rotatable positions about said vertical axis.

2. A mirror swing lock mechanism of the type set forth in claim 1 wherein at least one of said first or second detent means is formed of a material which allows said detent means to be recoverably deformable so as to permit the detent means to become disengaged as said arm (12) is rotated relative to the bracket assembly (30).

3. A mirror swing lock mechanism of the type set forth in claim 1 wherein the bracket assembly includes a pair of elements (32, 34) which coact to form the cylindrical surface (36, 38) and fastening means (50) for securing said elements together to clampingly support the vertical arm portion (40) therebetween.

4. A mirror swing lock mechanism of the type set forth in claim 1 wherein the bracket assembly comprises a plate (22) having a first surface conforming to the shape of an adjacent vehicle surface, a second surface (28) to which the bracket assembly (20) is mounted and fastening means (50) for securing said assembly to said plate.

5. A mirror swing lock mechanism of the type set forth in claim 4 wherein a cover member (66) is provided for enclosing said plate (22) and bracket assembly (30).

6. A mirror swing lock mechanism of the type set forth in claim 1 wherein the first and second detent means comprise a plurality of coacting elongated grooves (54, 56) and ribs (42, 44) disposed parallel to the vertical axis of said mirror arm (12).

7. A mirror swing lock mechanism of the type including an arm (12) having a generally horizontal mirror supporting section (14) and a depending generally vertical section (18), a bracket assembly (30) for adjustably supporting said vertical arm portion to the exterior surface of a vehicle, the bracket assembly and the vertical arm section coacting to provide a mechanism for releasably retaining said arm in a plurality of positions about a generally vertical axis coaxial with the vertical arm section, the improvement in said mechanism comprising:
   a) the Vertical arm section (18) having a portion (40) of circular cross section in the outer surface of which is formed a plurality of circumferentially spaced longitudinally extending grooves (54, 56);
   b) the bracket assembly including means (32, 34) defining a generally cylindrical surface (36, 38) adapted to receive and support the circular portion of the vertical arm section; and
   c) a plurality of longitudinally extending ribs (42, 44) circumferentially spaced about the cylindrical surface (36, 38) of said means and nestingly coacting with the grooves to releasably retain said arm in a plurality of rotatable positions about said vertical axis 8. A mirror swing lock mechanism of the type set forth in claim 7 wherein said means (32, 34) is formed of a material which allows said ribs to be displaced out of nesting engagement with said grooves as said arm (12) is rotated relative to the bracket assembly (30).

9. A mirror lock mechanism of the type set forth in claim 7 wherein at least one rib (42,44) is formed in each semi-cylindrical surface (36, 38) and projects radially inwardly therefrom to nestingly engage a proximately disposed arm groove (54, 56).

10. A mirror swing lock mechanism of the type set forth in claim 9 wherein each member (32, 34) includes a thin wall section (62, 64) from which each rib (42, 44) projects, each thin wall section permitting its rib to be deflected radially outwardly from its semi-cylindrical surface and thereby move out of nesting engagement with an arm groove (54, 56) when the arm is rotated about its vertical axis.

* * * * *